United States Patent Office 3,223,479
Patented Dec. 14, 1965

3,223,479
LEAVENING COMPOUND
Reginald E. Vanstrom, Crete, Ill., assignor to Stauffer Chemical Company, New York, N.Y., a corporation of Delaware
No Drawing. Continuation of application Ser. No. 172,865, Feb. 13, 1962. This application Jan. 5, 1965, Ser. No. 423,605
1 Claim. (Cl. 23—107)

This application is a continuation of my copending application U.S. Serial No. 172,865, filed February 13, 1962, now abandoned.

The invention hereinafter disclosed is directed to a new leavening compound, specifically a new complex crystalline sodium aluminum acid orthophosphate and its method of manufacture.

There are today three known compounds classified as sodium aluminum acid orthophosphates. The compound of the formula, $NaAl_3H_{14}(PO_4)_8 \cdot 4H_2O$ (disclosed in U.S. Patent 2,550,490), usually given the generic name sodium aluminum phosphate or simply SAP, is presently the most important commercial compound of the group. A more recent compound is the dehydrated form of SAP having the formula $NaAl_3H_{14}$-$(PO_4)_8$, see e.g., U.S. Patent 2,957,750. The amorphous compound of the formula $NaAl_3H_{11}(PO_4)_7 \cdot 5$–$8H_2O$ was disclosed in U.S. Patent 2,995,421. These known sodium aluminum acid orthophosphates are useful, for example, as leavening agents for a variety of baked good, as melt-controlling additives for cheese, and as fat-binding additives for meats.

I have now discovered a new complex sodium aluminum acid orthophosphate. At room temperature it is in the form of finely divided, white particles. X-ray powder patterns show that the compound has a new crystalline structure. The compound has utility in the same general fields as the prior art sodium aluminum acid orthophosphates, but with substantial differences in several chemical properties, especially those which affect its performance as a leavening acid.

The method which I prefer to use for preparing the new compound comprises adding sodium hydroxide or carbonate and trivalent aluminum compound (e.g., $Al_2O_3 \cdot 3H_2O$) to phosphoric acid, the reactants being in stoichiometric proportions to furnish an atomic ratio of Na:Al:P of about 3:3:8. The reaction mixture, a translucent viscous liquid, is thereafter heated and agitated to drive off excess water, i.e., water in excess of crystal water and water of constitution. As the excess water is moved, the reaction mixture becomes progressively more viscous until crystallization occurs. The damp crystals are then further dried until a constant weight is reached and the product is recoverable as finely divided opaque, white crystals.

To obtain a suitably fast but controllable rate of reaction, the phosphoric acid reactant is preferably heated to between about 40° C. and 60° C. for the addition of the sodium hydroxide or carbonate reactant, and between about 90° C. and 120° C. for the addition of the trivalent aluminum compound. Nevertheless, the sodium and aluminum compounds will react with the phosphoric acid at any temperature between about room temperature and the boiling point of the acid. Where the sodium and aluminum compounds are added simultaneously, the mixture temperature is preferably maintained at between about 80° C. and 100° C. The reaction mixture may be dried at a temperature between 45° C. and 160° C., preferably between 80° C. and 120° C.

Both continuous and batch methods may be employed in the preparation of the compound of the present invention. One suitable industrial batch method comprises charging the phosphoric acid to a large heated reactor equipped with a paddle agitator, adding the sodium and aluminum compounds to the acid and agitating until a dry white product is formed.

Reaction and drying times will, of course, depend upon the particular mode selected for preparing the compound, e.g., whether batch or continuous, the amount of water originally present in the acid and the sodium and aluminum compounds, and the temperatures selected for the different operations. Usually, on an industrial scale, the reaction time will not exceed thirty minutes, while the drying time can range between about thirty minutes and three hours.

The compound of the present invention may be quickly characterized by X-ray powder diffraction patterns, by virtue of its distinct crystalline lattice. The patterns of both prior art crystalline sodium aluminum acid orthophosphates differ from that of the new compound as to the spacing and intensity of the major lines of the patterns. For example, the $d$-spacings of the lines of greatest intensity for sodium aluminum phosphate, $NaAl_3H_{14}(PO_4)_8 \cdot 4H_2O_9$ referred to hereinafter as SAP, are at 2.99, 3.67 and 8.70 angstroms while those for my new compound are at approximately 3.07, 4.00 and 8.10 angstroms. A similar difference can be seen when comparing the major lines of dehydrated SAP, $NaAl_3H_{14}(PO_4)_8$, referred to hereinafter as DSAP, with my new compound. Table I shows the $d$-spacings and the relative line intensities of the X-ray patterns of SAP, DSAP, and my new compound.

TABLE I

| Compound of the Present Invention | | SAP | | DSAP | |
|---|---|---|---|---|---|
| $d$ | Intensity | $d$ | Intensity | $d$ | Intensity |
| A. | | A. | | A. | |
| 8.10 | 100 | 8.70 | 100 | 8.64 | 40 |
| 5.75 | 50 | 7.50 | 10 | 7.73 | 100 |
| 5.30 | 5 | 4.74 | 5 | 4.83 | 15 |
| 4.94 | 30 | 4.25 | 5 | 4.11 | 1 |
| 4.34 | 5 | 3.67 | 100 | 3.92 | 15 |
| 4.00 | 100 | 3.21 | 40 | 3.74 | 50 |
| 3.56 | 20 | 3.08 | 15 | 3.61 | 30 |
| 3.42 | 20 | 2.99 | 75 | 3.51 | 30 |
| 3.26 | 5 | 2.82 | 30 | 3.14 | 10 |
| 3.07 | 100 | 2.77 | 20 | 2.99 | 25 |
| 2.99 | 50 | 2.73 | 20 | 2.88 | 5 |
| 2.88 | 40 | 2.43 | 25 | 2.75 | 5 |
| 2.67 | 20 | 2.38 | 5 | 2.55 | 20 |
| 2.48 | 10 | 2.22 | 5 | 2.42 | 20 |
| 2.40 | 10 | 2.14 | 15 | 1.91 | 3 |
| 2.25 | 10 | 2.02 | 30 | 1.82 | 3 |
| 2.19 | 5 | 1.91 | 30 | | |
| 2.06 | 30 | 1.83 | 5 | | |

The relative intensities of Table I were estimated from X-ray film patterns by assigning values ranging from 0 for no lines, up to 100 for the lines of highest intensity. Slight corrections in the values were made to compensate for over-all differences of image intensity between films, caused by the usual minor inconsistencies in exposure and development.

In general, the compound of the present invention exhibits marked differences in chemical characteristics, and especially in leavening characteristics when compared to the complex sodium aluminum acid orthophosphates of the prior art. For example, my new compound has a slower "bench action," (that is, it effects a slower rate of gas evolution when contained in a prepared dough together with bicarbonate of soda), and a much lower degree of hygroscopcity than the sodium aluminum acid orthophosphates available heretofore. Each of these characteristics provides a material advantage in certain specific commercial applications of the leavening acid. Low bench action, for instance, is very desirable when preparing batters or doughs which are to be frozen or stored for any length of time. The retarded liberation of gas prevents "swelling" of the batter or dough during packaging and storage. In the preparation of cakes and other goods which do not require appreciable proofing before the baking operation, the low bench action of the new compound conserves leavening gas for later liberation at oven temperatures.

All of the prior art sodium aluminum acid orthophosphates are capable of absorbing large quantities of atmospheric moisture. SAP, for example, will absorb usually 28–29% of its original weight of water when exposed at conditions of 35° C. and 75% R.H. for 140 hours. Similarly, the other two prior art compounds absorb about 20–29% water under the same conditions. By contrast, the compound of the present invention increases in weight by only about 2–4% during exposure for 140 hours at 35° C. and 75% R.H. Thus the new compound does not require specialized storage or shipping containers and is more suitable for use in a hot, humid climate.

The following specific example is illustrative of the preparation and properties of the compound of this invention.

*Example*

In a Hobart mixer bowl fitted with a Glas Col heating mantle was placed 522.5 grams of 75% orthophosphoric acid. A dry mixture consisting of 80 grams of soda ash and 117 grams of hydrated alumina was then slowly added to the orthophosphoric acid. When the addition was complete, the mixer bowl was heated to maintain the mixture at a temperature of 65–75° C. and the paddle agitator was started. Agitation and heating were continued for about 2.5 hours during which time the mixture was observed to undergo reaction and a slow transition from a viscous fluid to a dry crystalline state. After cooling, the product was milled to pass a 140 mesh screen and dried to constant weight in a 55° C. oven (about 4 hours). The dried product exhibited incongruent solubility in $H_2O$, leaving an insoluble residue (about 15%) consisting of a mixture of $Al_2O_3$ and an amorphous aluminum phosphate. On ignition, the final product was found to have a loss of weight of 19.3%, based on its original weight. A one percent solution of the dried product was found to have a pH of 2.8. Analysis showed 6.6% Na, 8.3% Al, and 24.8% P, while X-ray powder patterns showed major lines at 3.07, 4.00 and 8.10 angstroms.

Using substantially the same procedure described in the above example, the amount of sodium added (as soda ash reactant) to the orthophosphoric acid was varied to provide reaction products containing 3.25, 2.75, 2.50 or 2.25 gram atoms of sodium for each three gram atoms of aluminum and eight gram atoms of phosphorus. X-ray powder patterns taken of the products with either more or less sodium than the empirically determined optimum ratio (Na:Al:P=3:3:8) showed some of the lines of the new compound, but with a marked decrease in intensity and/or the appearance of new lines. Changes in the patterns were observed when the sodium was varied by as little as 0.25 gram atoms from the optimum ratio. Apparently, the variation from stoichiometric quantities resulted in the formation of mixtures containing SAP, the new compound, and probably an amorphous material. As might be expected, when the sodium was less than the optimum ratio, the major lines of SAP appeared, while mixtures formed when the stoichiometric requirement was exceeded had patterns which indicated the presence of large amounts of amorphous material. The $d$-spacings and intensities of the major lines of the X-ray powder patterns for the mixtures, as well as the product of the 3:3:8 (Na:Al:P) reactant ratio are shown in Table II, wherein the lines at 8.70, 3.67 and 2.99 are the three major lines for SAP.

TABLE II

[Reactant ratio (Na:Al:P)]

| $d$ | 3.25:3:8 Intensity | 3:3:8 Intensity | 2.75:3:8 Intensity | 2.50:3:8 Intensity | 2.25:3:8 Intensity |
| --- | --- | --- | --- | --- | --- |
| A | | | | | |
| 8.70 | 0 | 0 | 5 | 30 | 60 |
| 8.10 | 60 | 100 | 75 | 50 | 30 |
| 5.75 | 30 | 50 | 30 | 15 | 0 |
| 5.30 | 0 | 5 | 0 | 0 | 0 |
| 4.94 | 15 | 30 | 20 | 10 | 0 |
| 4.34 | 0 | 5 | 0 | 0 | 0 |
| 4.00 | 60 | 100 | 70 | 50 | 30 |
| 3.67 | 0 | 0 | 5 | 30 | 60 |
| 3.56 | 5 | 20 | 15 | 10 | 5 |
| 3.42 | 5 | 20 | 15 | 10 | 5 |
| 3.26 | 0 | 5 | 0 | 0 | 0 |
| 3.07 | 60 | 100 | 70 | 50 | 30 |
| 2.99 | 25 | 50 | 55 | 60 | 70 |
| 2.88 | 20 | 40 | 35 | 30 | 25 |
| 2.67 | 10 | 20 | 15 | 10 | 5 |
| 2.48 | 0 | 10 | 5 | 0 | 0 |
| 2.40 | 0 | 10 | 5 | 0 | 0 |
| 2.25 | 0 | 10 | 5 | 0 | 0 |
| 2.19 | 0 | 5 | 0 | 0 | 0 |
| 2.06 | 15 | 30 | 20 | 10 | 5 |

The pronounced decrease in intensity of the major lines when the sodium exceeds three gram atoms, shown in Table II, indicates the presence of non-crystalline material. The formation of SAP in the mixture is indicated by the appearance of lines at 8.70 and 3.67 angstroms when a reactant ratio of 2.75:3:8 is used. However, from a consideration of the relative intensities of the SAP and the 3:3:8 product lines, it is probable that the new compound predominates at ratios as low as at least 2.50:3:8.

I have also discovered that X-ray powder patterns of mixtures formed from reactant ratios of 0–2.00:3:8 contain no discernable lines for the novel compound of the invention. Likewise, mixtures having four or more gram atoms of sodium for each three gram atoms of aluminum and eight gram atoms of phosphorus do not have patterns which show the presence of my new compound.

The compound of the present invention has all of the essential characteristics of a leavening acid. For example, it does not impart off-taste to baked goods. Its "neutralizing value," a standard criterion of the baking art, ranges between about 85 and 89. Neutralizing value is a measurement of the parts by weight of bicarbonate of soda which will be neutralized by exactly 100 parts by weight of a given leavening acid. Essentially all of the leavening acids of the prior art have neutralizing values which fall within the range of about 60 to 115.

In general, the baking response of the new compound shows it to be especially suitable for cakes and frozen batters and doughs. By the two minute Reaction Rate Test, the new compound has been found to liberate 53 cc. of $CO_2$ gas, approximating the rate of SAP. But more significant, the two to fifteen minute difference in $CO_2$ liberation is only about 10 cc. compared to about 20 cc. for SAP. This difference becomes important when the dough is to be held prior to baking. The slower gas formation between two and fifteen minutes allows better control of the baking operation. The two minute Reaction Rate Test is a standard analytical method used for reactivity studies and involves reacting a baking acid with sodium bicarbonate at a temperature of 27° C.±0.5° C. The proportions of acid and bicarbonate used are those which are theoretically capable of liberating 200 cc. of $CO_2$ gas. More details regarding reaction rate testing, as well as the apparatus required, are found in Cereal Chemistry, vol. 8, 1931, pp. 423–433.

The present continuing application excludes the empirical formula assigned to my novel compound in my prior application Serial Number 172,865, which formula now appears to be inaccurate.

The foregoing detailed description is given for clearness of understanding only and no unnecessary limitations should be implied therefrom.

What I claim is:

A novel complex crystalline sodium aluminum acid orthophosphate which exhibits X-ray powder diffraction lines of major intensity at $d$-spacings of approximately 8.10, 4.10 and 3.07 angstroms prepared by reacting a compound selected from the group consisting of sodium hydroxide and sodium carbonate and a reactive trivalent inorganic aluminum compound with aqueous phosphoric acid, the reactants containing sodium, aluminum and phosphorus being added in proportions to provide a reaction mixture having a ratio of Na:Al:P of about 3:3:8 heating the resulting viscous reaction mixture between 45° C. and 160° C. until a dry crystalline product forms and recovering the dry crystalline product.

References Cited by the Examiner

UNITED STATES PATENTS

| | | | |
|---|---|---|---|
| 2,538,867 | 1/1951 | Greger | 23—105 |
| 2,550,490 | 4/1951 | McDonald | 23—107 |
| 2,550,491 | 4/1951 | McDonald | 99—95 |
| 2,774,672 | 12/1956 | Griffith | 23—106 X |
| 2,957,750 | 10/1960 | Knox et al. | 23—105 |
| 2,995,421 | 8/1961 | Dyer | 23—105 |
| 3,041,177 | 6/1962 | Lauck | 99—95 |
| 3,097,949 | 7/1963 | Lauck et al. | 23—105 X |

MAURICE A. BRINDISI, *Primary Examiner.*